United States Patent
Si et al.

(10) Patent No.: US 7,998,016 B2
(45) Date of Patent: Aug. 16, 2011

(54) UNIVERSAL GEAR TRAIN

(75) Inventors: Baojun Si, Dunlap, IL (US); Barry Mei, Oswego, IL (US); William H. Lane, Chillicothe, IL (US); James Stephen Rice, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 306 days.

(21) Appl. No.: 12/318,008

(22) Filed: Dec. 19, 2008

(65) Prior Publication Data
US 2010/0160108 A1   Jun. 24, 2010

(51) Int. Cl.
*F16H 3/44* (2006.01)
(52) U.S. Cl. ......... 475/284; 903/906; 903/911; 903/918
(58) Field of Classification Search .................. 475/284, 475/288
See application file for complete search history.

(56) References Cited

U.S. PATENT DOCUMENTS

| | | | |
|---|---|---|---|
| 5,603,671 A * | 2/1997 | Schmidt | 475/5 |
| 5,853,345 A * | 12/1998 | Park | 475/284 |
| 6,551,208 B1 | 4/2003 | Holmes et al. | |
| 6,592,484 B1 | 7/2003 | Tsai et al. | |
| 6,837,816 B2 | 1/2005 | Tsai et al. | |
| 6,852,053 B2 | 2/2005 | Nakano et al. | |
| 7,070,530 B2 | 7/2006 | Ai et al. | |
| 7,117,965 B2 | 10/2006 | Yatabe et al. | |
| 7,128,675 B2 | 10/2006 | Klemen et al. | |
| 7,169,074 B2 * | 1/2007 | Raghavan et al. | 475/5 |
| 7,192,378 B2 * | 3/2007 | Raghavan et al. | 475/276 |
| 7,195,573 B2 | 3/2007 | Bezian et al. | |
| 7,214,154 B2 | 5/2007 | Klemen et al. | |
| 7,220,202 B2 | 5/2007 | Singh et al. | |
| 7,291,080 B2 | 11/2007 | Minagawa et al. | |
| 7,389,168 B2 | 6/2008 | Imazu et al. | |
| 7,395,837 B2 | 7/2008 | Foster et al. | |
| 2006/0052199 A1 * | 3/2006 | Singh et al. | 475/5 |
| 2007/0287564 A1 | 12/2007 | Cho et al. | |
| 2007/0287565 A1 | 12/2007 | Cho et al. | |
| 2008/0125264 A1 | 5/2008 | Conlon et al. | |
| 2008/0125265 A1 | 5/2008 | Conlon et al. | |
| 2008/0207373 A1 * | 8/2008 | Conlon | 475/5 |

* cited by examiner

*Primary Examiner* — Justin Holmes
(74) *Attorney, Agent, or Firm* — Finnegan, Henderson, Farabow, Garrett & Dunner, LLP (57) ABSTRACT

A gear train includes a first planetary gear set including a first sun gear, a first ring gear, and a first carrier and a second planetary gear set including a second sun gear, a second ring gear, and second carrier. The gear train also includes a first clutch configured to selectively connect the first carrier with the second carrier and a second clutch configured to selectively connect the first sun gear with the second sun gear. The gear train also includes a first brake configured to selectively fix the first sun gear, a second brake configured to selectively fix the second sun gear, and a third brake configured to selectively fix the first carrier.

18 Claims, 6 Drawing Sheets

UNIVERSAL GEAR TRAIN

TECHNICAL FIELD

The present disclosure relates to a gear train and, more particularly, to a universal gear train.

BACKGROUND

Typically vehicles and/or machines include a fuel-powered engine providing mechanical power to a transmission. The transmission typically includes a plurality of selectable gear ratios that transfer the mechanical power from the engine to one or more loads. For example, the transmission may be configured to deliver mechanical power to one or more traction devices so as to propel the vehicle or machine. Hybrid vehicles and/or machines include one or more motor/generators operatively connected to the transmission. The motor/generators are selectively operated to provide extra mechanical power to the transmission, i.e., in addition to the engine, or to receive extra mechanical power from the transmission, i.e., from the engine. The received mechanical power may be converted into electrical power and stored for later use. Additionally, a hybrid vehicle or machine may be configured to selectively operate in a motor/generator only mode, i.e., the transmission may only receive mechanical power from the motor/generators.

U.S. Pat. No. 7,220,202 ("the '202 patent") issued to Singh et al. discloses an electrically variable transmission. The transmission includes first and second planetary gear sets. An input member is continuously connected to the ring gear of the first planetary gear set and an output member is continuously connected to the carrier of the second planetary gear set. The transmission also includes a first motor/generator continuously connected to the sun gear of the first planetary gear set and a second motor/generator continuously connected to the sun gear of the second planetary gear set. The transmission also includes five torque transfer devices. Three torque transfer devices selectively interconnect components of the first and second planetary gear sets to one another, i.e., act as clutches. Two torque transfer devices selectively fix components of the first and second planetary gear sets to a housing, i.e., act as brakes.

The transmission of the '202 patent may be operable in different operating modes depending upon the combination of torque transfer devices that are engaged. However, because of the particular arrangement of the various components of the transmission, e.g., the motor/generators and the torque transfer devices, the transmission of the '202 patent may have a limited set of operating modes. As such, the transmission of the '202 patent may be limited in its applicability.

The present disclosure is directed to overcoming one or more of the shortcomings set forth above and/or other shortcomings in the art.

SUMMARY

In one aspect, the present disclosure is directed to a gear train. The gear train includes a first planetary gear set including a first sun gear, a first ring gear, and a first carrier and a second planetary gear set including a second sun gear, a second ring gear, and second carrier. The gear train also includes a first clutch configured to selectively connect the first carrier with the second carrier and a second clutch configured to selectively connect the first sun gear with the second sun gear. The gear train also includes a first brake configured to selectively fix the first sun gear, a second brake configured to selectively fix the second sun gear, and a third brake configured to selectively fix the first carrier.

In another aspect, the present disclosure is directed to a gear train. The gear train includes a plurality of planetary gear sets. Each of the plurality of planetary gear sets includes a sun gear, a carrier, and a ring gear. The plurality of planetary gear sets consists essentially of a first planetary gear set and a second planetary gear set. The gear train also includes a plurality of clutches. Each of the plurality of clutches is configured to selectively connect and disconnect a component of the first planetary gear set to a component of the second planetary gear set. The gear train also includes a plurality of brakes. Each of the plurality of brakes is configured to selectively fix at least one component of one of the first and second planetary gear sets. By selectively engaging one or more of the plurality of clutches and plurality of brakes, a plurality of operating modes are enabled. The plurality of operating modes includes a first mode. In the first mode, the first and second planetary gear sets operate in series via an electrical connection and are mechanically disconnected from one another. The plurality of operating modes also includes a second mode. In the second mode, the first and second planetary gear sets operate in parallel via a mechanical connection and are electrically disconnected. The plurality of operating modes also include a third mode. In the third mode, the first and second planetary gear sets operate in a continuously variable transmission mode and are connected to one another via a mechanical connection therebetween and an electrical connection therebetween.

DETAILED DESCRIPTION

Figure 1:
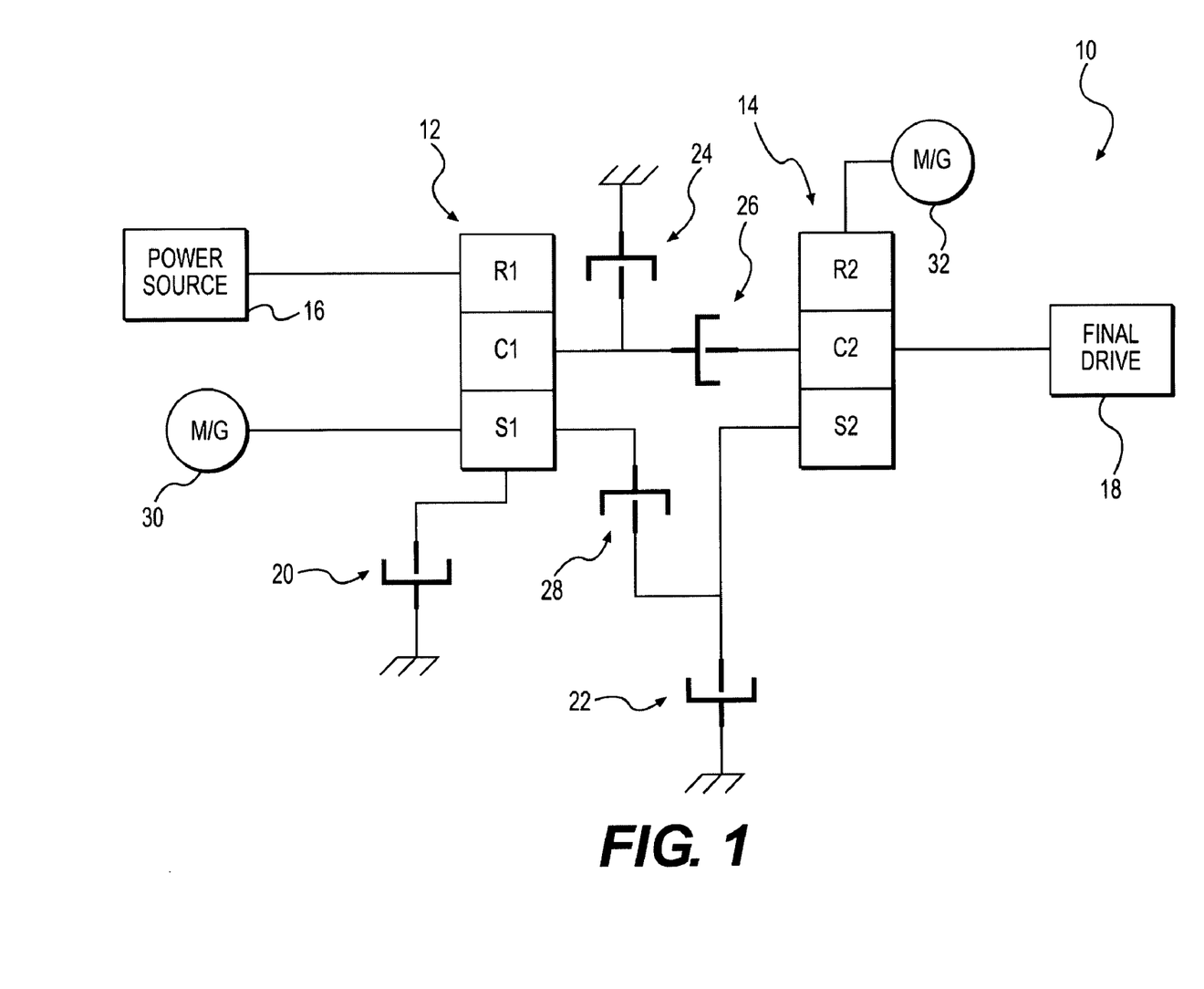
FIG. 1 is a schematic illustration of an exemplary gear train in accordance with the present disclosure.

FIG. 1 schematically illustrates an exemplary gear train 10. Gear train 10 may include first and second planetary gear sets 12, 14 and may be configured to operatively receive input power from a power source 16 and operatively deliver output power to a final drive 18. Gear train 10 may be housed within a transmission housing (not shown) and may further include first, second, and third brakes 20, 22, 24, configured to selectively fix one or more components of first and second planetary gear sets 12, 14 with respect to the housing, i.e., a non-rotatable structure. Gear train 10 may also include first and second clutches 26, 28 configured to selectively interconnect one or more components of first planetary gear set 12 with second planetary gear set 14. Gear train 10 may further include first and second motor/generators 30, 32 interconnected with first and second planetary gear sets 12, 14. In addition, a controller (not shown) may be configured to control the operation of first, second, and third brakes 20, 22, 24, first and second clutches 26, 28, as well as first and second motor/generators 30, 32. Final drive 18 may be operatively connected to a drivable load (not shown) such that gear train 10 is configured to supply a torque and angular speed thereto. It is contemplated that first and second planetary gear sets 12, 14, first, second, and third brakes 20, 22, 24, and first and second clutches 26, 28 may be housed within a transmission housing. It is also contemplated that first and second motor generators 30, 32 may also be housed within the transmission housing. It is further contemplated that gear train 10 may be physically oriented within the transmission housing in any arrangement.

First and second planetary gear sets 12, 14, may each include a sun gear, a plurality of planet gears each rotatably mounted to a carrier, and a ring gear. As is known in the art, the planet gears may be disposed radially between and intermeshed with both the sun gear and the ring gear. The sun gear may be disposed radially inside the planet gears and the ring gear is disposed radially outside the planet gears. Specifically, first planetary gear set 12 may include a sun gear S1, a carrier C1, and a ring gear R1. Second planetary gear set 14 may include a sun gear S2, a carrier C2, and a ring gear R2. Planetary gear sets are well known in the art and as such are not further described. As is conventional, the planetary gear sets are schematically shown throughout the drawings.

Power source 16 may include any source of power such as, for example, a gasoline or diesel combustion engine, a fuel cell powered mover, a natural gas engine, and/or any other power producing device known in the art. Power source 16 may also include a prime mover, e.g., a crankshaft that is mechanically coupled to gear train 10. Specifically, crankshaft may be continuously connected to ring gear R1 of the first planetary gear set, i.e., the first ring gear R1. As such, power source 16 may be configured to provide input power to gear train 10.

Final drive 18 may be operatively connected to one or more loads, e.g., traction devices, and may be configured to transfer mechanical power from gear train 10 thereto. Final drive 18 may be continuously connected to carrier C2 of the second planetary gear set, i.e., the second carrier C2. It is contemplated that final drive 18 may include one or more additional gear sets or gear trains configured to further modify the mechanical power, i.e., the torque and/or angular velocity, of second carrier C2, and thus, the output power of gear train 10.

First, second, and third brakes 20, 22, 24, may each be configured to selectively operate in a first, disengaged mode permitting rotational motion and a second, engaged mode substantially prohibiting rotational motion. First brake 20 may be interconnected between the housing and sun gear S1 of first planetary gear set 12, i.e., the first sun gear S1. When engaged, first brake 20 may be configured to selectively prohibit first sun gear S1 from rotating. Second brake 22 may be interconnected between the housing and sun gear S2 of second planetary gear set 14, i.e., the second sun gear S2. When engaged, second brake 22 may be configured to selectively prohibit second sun gear S2 from rotating. Third brake 24 may be interconnected between the housing and carrier C1 of first planetary gear set 12, i.e., the first carrier C1. When engaged, third brake 24 may be configured to selectively prohibit first carrier C1 from rotating. Each of first, second and third brakes 20, 22, 24 may include any conventional brake apparatus.

First and second clutches 26, 28 may each be configured to selectively operate in a first, disengaged mode permitting relative rotation between two components and a second, engaged mode substantially prohibiting relative rotation between two components. First clutch 26 may be interconnected between first carrier C1 and the carrier C2 of second planetary gear set 14, i.e., the second carrier C2. When engaged, first clutch 26 may be configured to selectively connect first and second carriers C1 and C2 together such that they rotate at substantially the same speed. Second clutch 28 may be interconnected between first sun gear S1 and second sun gear S2. When engaged, second clutch may be configured to selectively connect first and second sun gears S1 and S2 together such that they rotate at substantially the same speed. Each of first and second clutches 26, 28 may include any conventional clutch apparatus.

As explained above, second brake 22 may be connected to second sun gear S2. As such, when second brake 22 and second clutch 28 are both engaged, first and second sun gears S1 and S2 may both be substantially prohibited from rotating. Similarly, third brake 24 may be connected to first carrier C1. As such, when third brake 24 and first clutch 26 are both engaged, first and second carriers C1 and C2 may both be substantially prohibited from rotating.

First and second motor/generators 30, 32 may each be configured to operate in a first, driving mode configured to deliver mechanical power and a second, driven mode configured to receive mechanical power. First motor/generator 30 may be operatively connected to first sun gear S1 and may be configured to selectively receive and deliver mechanical power to first sun gear S1 depending upon its operational mode. Second motor/generator 32 may be operatively connected to the ring gear R2 of second planetary gear set 14, i.e., the second ring gear R2. Second motor/generator 32 may be configured to selectively receive and deliver mechanical power to second ring gear R2. First and second motor/generators 30, 32 may each be an electrical motor/generator including a stator, rotor, and/or additional components configured to selectively operate as a motor, i.e., convert electrical power to mechanical power, and as a generator, i.e., convert mechanical power to electrical power. It is contemplated that first and second motor/generators 30, 32 may, alternatively, each be a hydraulic or pneumatic motor/generator including one or more chambers and/or additional components configured to selectively operate as a motor, i.e., convert hydraulic or pneumatic power to mechanical power, and as a generator, i.e., convert mechanical power to hydraulic or pneumatic power. It is also contemplated that first and second motor/generators 30, 32 may be configured to selectively operate in forward and reverse directions when operating as either a motor or a generator. It is noted that for clarification purposes the description of gear train 10 below is made with reference to first and second motor/generators 30, 32 being configured electrical motor/generators. The below description is equally applicable to first and second motor/generators configured as hydraulic or pneumatic motor/generators.

Gear train 10 may be operable in a plurality of different operating modes by selectively engaging one or more of first, second, and third brakes 20, 22, 24, selectively engaging one or more of first and second clutches 26, 28, as well as selectively controlling the operating mode of first and second motor/generators 30, 32. Table 1 shows a plurality of operating modes of gear train 10. Table 1 designates, for each operating mode, which of the first, second, and third brakes 20, 22, 24 as well as which of first and second clutches 26, 28 are engaged. In addition, Table 1 shows the operating mode of first and second motor/generators 30, 32.

TABLE 1

|  | B1 Engaged | B2 Engaged | B3 Engaged | C1 Engaged | C2 Engaged | M/G 1 Status | M/G 2 Status |
|---|---|---|---|---|---|---|---|
| Series |  | yes | yes |  |  | gen. | mtr. |
| Parallel | yes | yes |  | yes |  | off | mtr. |
| Input CVT |  | yes |  | yes |  | gen. | mtr. |
| Compound CVT |  |  |  | yes | yes | gen/mtr. | gen./mtr. |
| Parking (engine off) | yes | yes | yes | yes | yes | off | off |
| Parking (engine on) |  | yes | yes | yes |  | gen | off |
| Neutral (idle) |  |  |  |  |  | off | off |
| Starting (park) |  | yes | yes | yes |  | mtr. | off |
| Starting (neutral) |  | yes |  |  |  | mtr. | off |
| Reverse |  | yes |  |  |  |  | mtr. (rev) |
| Reverse (Series) |  | yes | yes |  |  | gen. | mtr. |
| Electric Drive 1 |  | yes |  |  |  | off | mtr. |
| Electric Drive 2 |  |  |  |  | yes | mtr. | mtr. |

Figure 2:
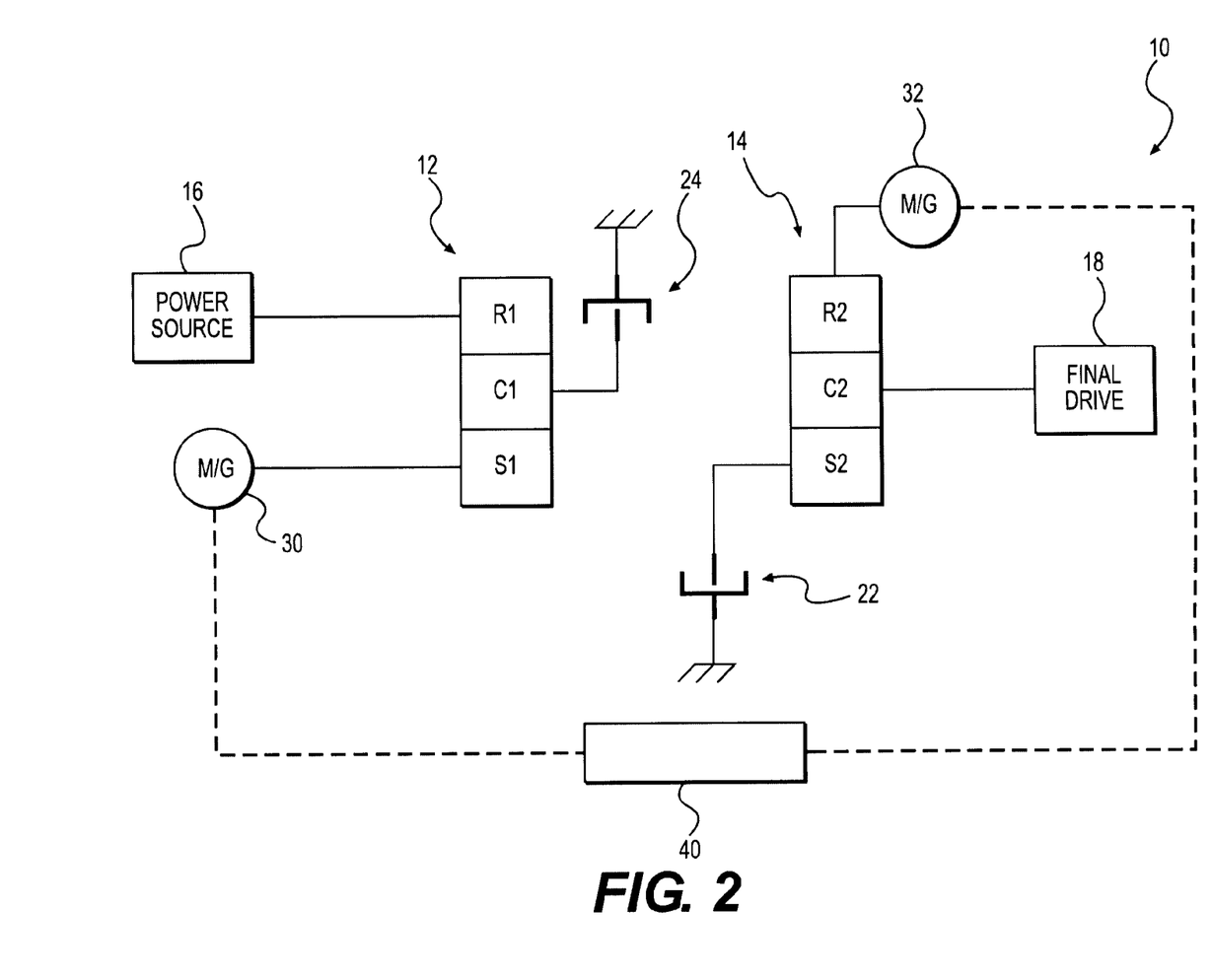
FIG. 2 is a schematic illustration of the gear train of FIG. 1 in an exemplary first operating mode.

FIG. 2 illustrates a first exemplary operating mode of gear train 10 in which second and third brakes 22, 24 are engaged. First operating mode may be configured as a "series" operating mode wherein first planetary gear set 12 may be mechanically disconnected from second planetary gear set 14 and may, instead, be electrically connected thereto in series. First brake 20 as well as first and second clutches 26, 28 may be disengaged and, for clarification purposes, are not illustrated. In the first operating mode, gear train 10 may receive input power from power source 16 via first ring gear R1 affecting first ring gear R1 to rotate. Third brake 24 may be engaged and may substantially prohibit first carrier C1 from rotating. As is known in the art, the individual planet gears, rotatably connected to first carrier C1, may freely rotate about their individual axis with respect to first carrier C1, even though the carrier itself may be fixed. As such, the planet gears may affect first sun gear S1 to rotate. First motor/generator 30 may receive mechanical power from first sun gear S1 and convert it into electrical power. First motor/generator 30 may be operatively connected to second motor/generator 32 via an electrical circuit 40, that may include a controller and/or one or more other electrical devices, e.g., a battery or switches.

Second motor/generator 32 may receive electrical power from first motor/generator 30, via circuit 40, convert the electrical power into mechanical power, and input mechanical power to second ring gear R2 affecting second ring gear R2 to rotate. Second brake 22 may be engaged and may substantially prohibit second sun gear S2 from rotating. As is known in the art, the individual planet gears, rotatably connected to second carrier C2, may freely rotate about their individual axis with respect to second carrier C2. Second carrier C2 may not be fixed, second sun gear S2 may be fixed, and the planet gears may revolve about second sun gear S2 affecting second carrier C2 to rotate about second sun gear S2.

Second carrier C2 may output mechanical power from gear train 10 to final drive 18. It is contemplated that by adjusting the amount of electrical power transferred from first motor/generator 30 to second motor/generator 32, the input-output ratio from power source 16 to final drive 18, i.e., the gear ratio of gear train 10, may be continuously varied. It is also contemplated that power source 16 may be operated at a substantially constant operating condition while the input-output ratio from power source 16 to final drive 18 may be varied via second motor/generator 32. In addition or alternatively, power source 16 may be operated at varying operating conditions to vary the input-output ratio from power source 16 to final drive 18 while second motor/generator 32 may be operated at substantially constant operating conditions.

Figure 3:
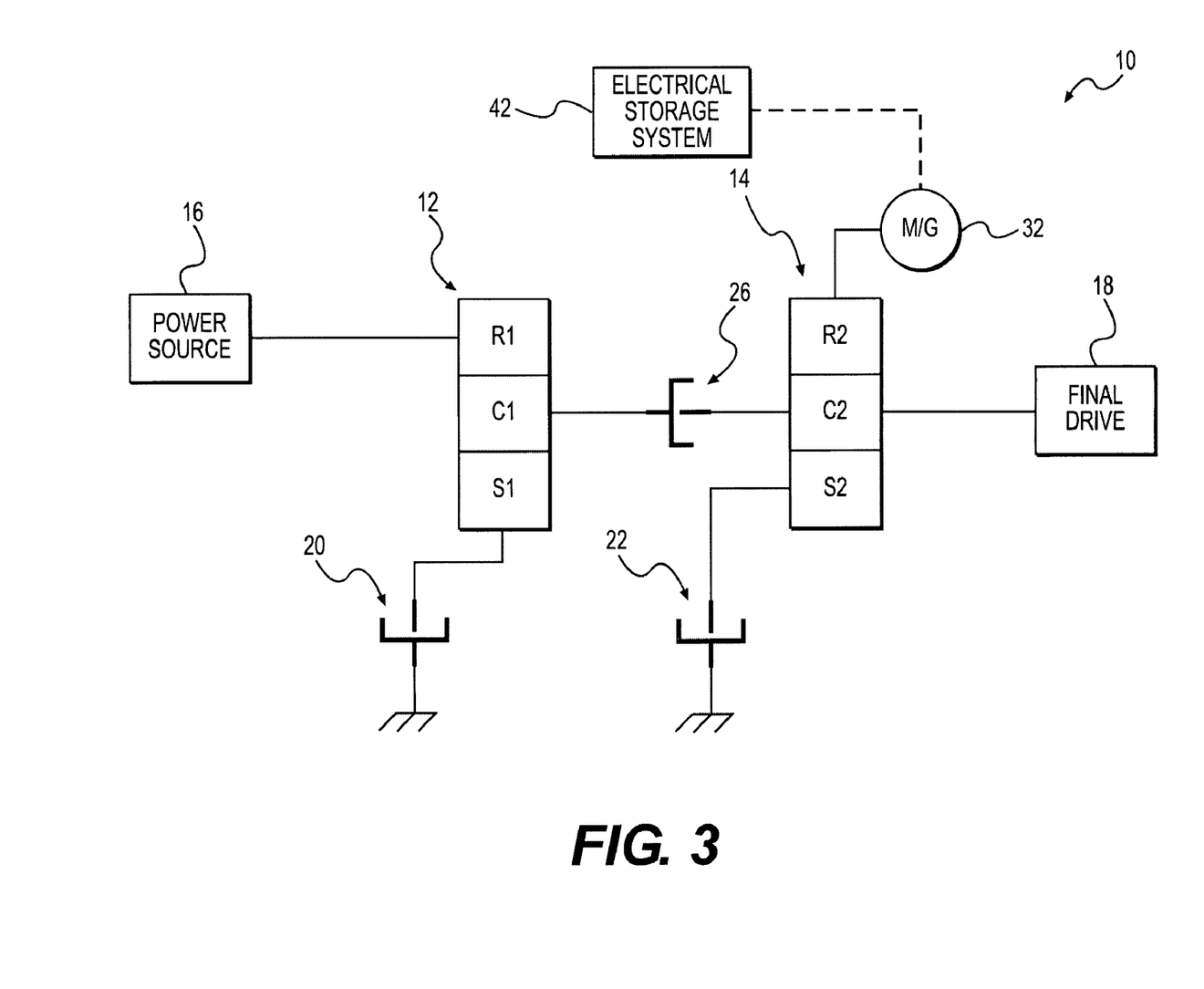
FIG. 3 is a schematic illustration of the gear train of FIG. 1 in an exemplary second operating mode.

FIG. 3 illustrates a second exemplary operating mode of gear train 10 in which first and second brakes 20, 22 as well as first clutch 26 are engaged. The second operating mode may be configured as a "parallel" mode wherein first and second planetary gear sets 12, 14 may each receive mechanical input power that may be combined and output to final drive 18. Third brake 24 and second clutch 28 may be disengaged and, for clarification purposes, are not illustrated. In the second operating mode, gear train 10 may receive input power from power source 16 via first ring gear R1 affecting first ring gear R1 to rotate. First brake 20 may be engaged and may substantially prohibit first sun gear S1 from rotating. As is known in the art, the individual planet gears, rotatably connected to first carrier C1, may freely rotate about their individual axis with respect to first carrier C1. First carrier C1 may not be fixed, first sun gear S1 may be fixed, and the planet gears may revolve about first sun gear S1 affecting first carrier C1 to rotate about first sun gear S1. First clutch 26 may be engaged mechanically connecting first and second carriers C1, C2 together. As such, first carrier C1 may affect second carrier C2 to rotate, i.e., rotate about second sun gear S2, which may be substantially prohibited from rotating via second brake 22.

Gear train 10 may also receive input power from an electrical storage system 42 via second motor/generator 32 and second ring gear R2. System 42 may include, for example, an electrical circuit, a controller, a battery, a capacitor, and/or other components known in the art. As is known in the art, the individual planet gears, rotatably connected to second carrier C2, may freely rotate about their individual axis with respect to second carrier C2. Second carrier C2 may not be fixed, second sun gear S2 may be fixed, and the planet gears may revolve about second sun gear S2 affecting second carrier C2 to rotate about second sun gear S2.

The mechanical power transferred to second carrier C2 from first ring gear R1, via first carrier C1 and first clutch 26, and from second ring gear R2 may be combined. Second carrier C2 may transfer the combined mechanical power to final drive 18. It is contemplated that by adjusting the amount of electrical power transferred from second motor/generator 32 to second ring gear R2, the input-output ratio from power source 16 to final drive 18 may be continuously varied. It is also contemplated that, similar to the first operating mode, power source 16 may be operated at a substantially constant operating condition while the input-output ratio from power source 16 to final drive 18 may be varied via second motor/generator 32. Alternatively, power source 16 may be operated at varying operating conditions to vary the input-output ratio from power source 16 to final drive 18 while second motor/generator 32 may be operated at substantially constant operating condition.

Figure 4:
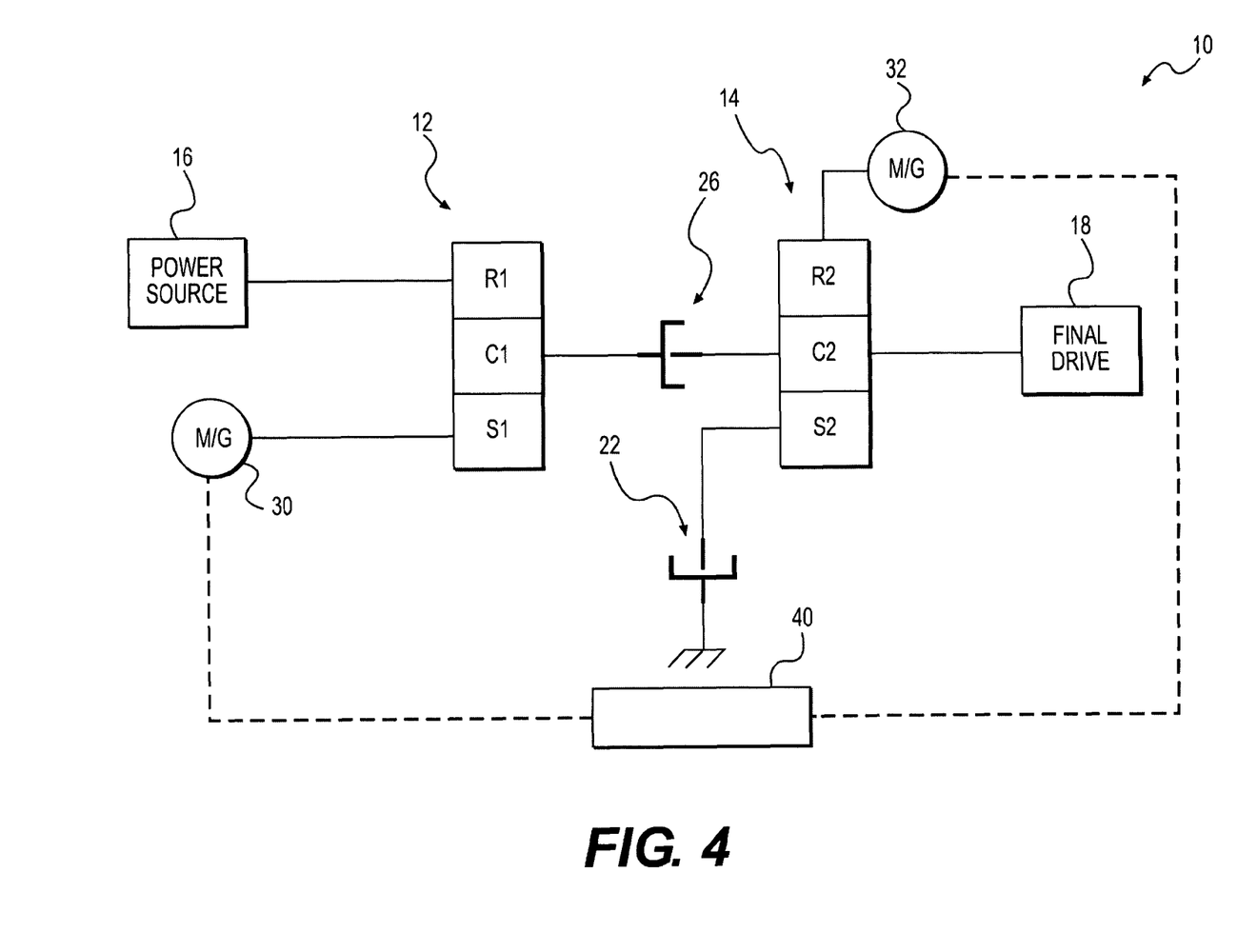
FIG. 4 is a schematic illustration of the gear train of FIG. 1 in an exemplary third operating mode.

FIG. 4 illustrates a third operating mode in which second brake 22 and first clutch 26 may be engaged. Third operating mode may be configured as a "input CVT" operating mode wherein first planetary gear set 12 may be mechanically and electrically connected to second planetary gear set 14. Specifically, first and second planetary gear sets 12, 14 may be mechanically connected via first and second carriers C1, and C2 and may be electrically connected via first and second motor/generators 30, 32. First and third brakes 20, 24 as well as second clutch 28 may be disengaged and, for clarification purposes, are not illustrated. In the third operating mode, gear train 10 may receive input power from power source 16 via first ring gear R1 affecting first ring gear R1 to rotate. As is known in the art, rotation of first ring gear R1 may affect the planet gears connected to first carrier C1 to rotate about their respective axes and revolve about first sun gear S1. In turn, first carrier C1 may also rotate about first sun gear S1, and first sun gear S1 may also rotate about its axis. Thus, first carrier C1 and first sun gear S1 may both rotate due to the rotation of first ring gear R1.

Similar to the second operating mode, first and second carriers C1 and C2 may be connected to one another, via the engagement of first clutch 26. As described above, first carrier C1 may affect second carrier C2 to rotate about second sun gear S2. Similar to the first operating mode, first motor/generator 30 may receive mechanical power from first sun gear S1, circuit 40 may transfer electrical power from first motor/generator 30 to second motor/generator 32, and second motor/generator 32 may input mechanical power to second ring gear R2. As described above, second ring gear R2 may affect second carrier C2 to rotate about second sun gear S2, which is substantially prohibited from rotating via the engagement of second brake 22.

The mechanical power transferred to second carrier C2 from first and second ring gears R1, R2 may be combined. Second carrier C2 may transfer the combined mechanical power to final drive 18. It is contemplated that the mechanical power received from power source 16 may be varied and the mechanical power received from second motor/generator 32 may be controlled to be substantially constant. Thus, the input-output ratio from power source 16 to final drive 18 may be continuously varied.

Figure 5:
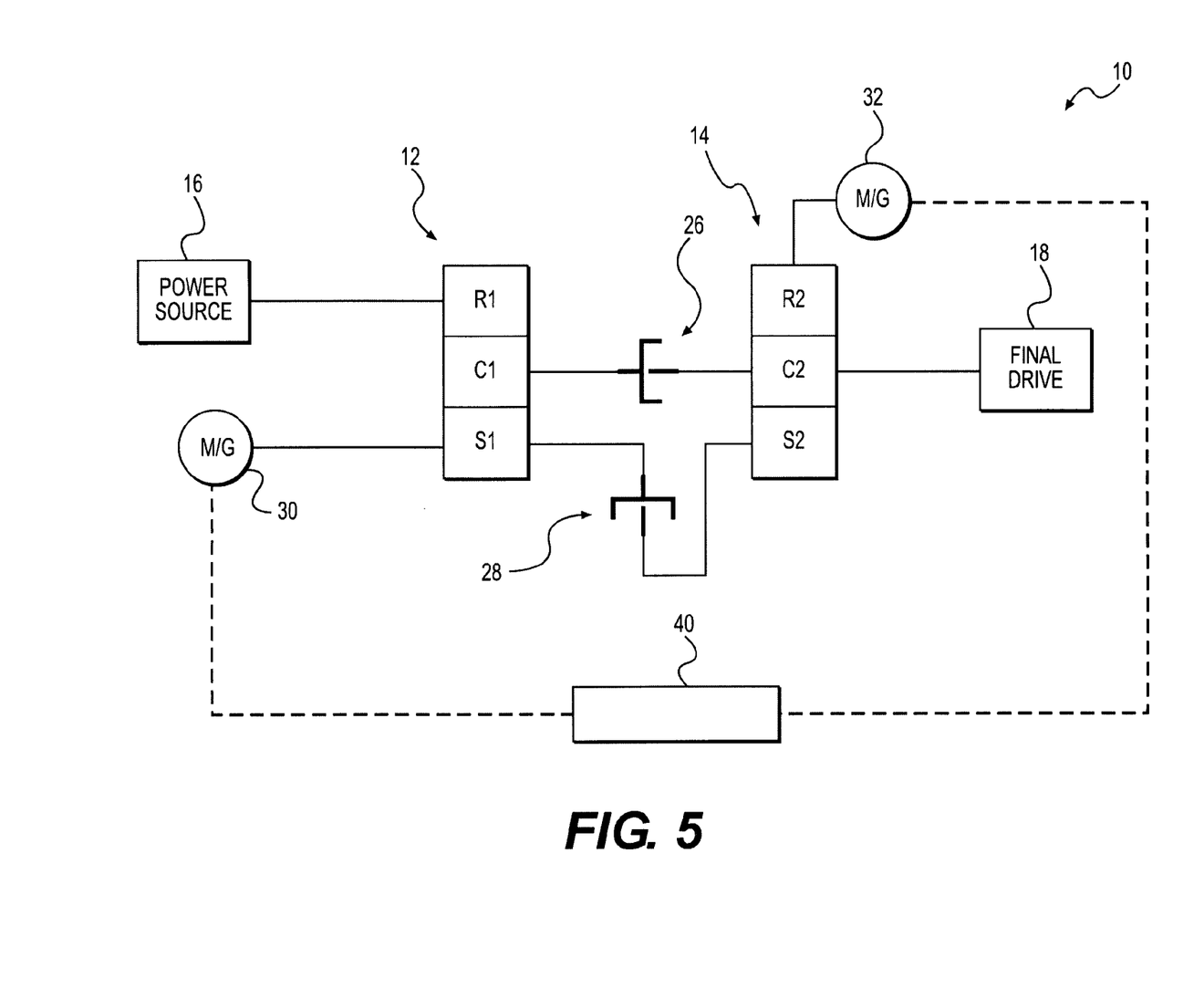
FIG. 5 is a schematic illustration of the gear train of FIG. 1 in an exemplary fourth operating mode.

FIG. 5 illustrates a fourth exemplary operating mode in which first and second clutches 26, 28 may be engaged. The fourth operating mode may be configured as a "compound CVT" operating mode wherein first planetary gear set 12 may be mechanically and electrically connected to second planetary gear set 14. Specifically, first and second planetary gear sets 12, 14 may be mechanically connected via first and second carriers C1, and C2 and first and second sun gears S1, S2. First and second planetary gear sets 12, 14 may be electrically connected via first and second motor/generators 30, 32. First, second, and third brakes 20, 22, 24 may be disengaged and, for clarification purposes, are not illustrated. In the fourth operating mode, gear train 10 may receive input power from power source 16 via first ring gear R1 affecting first ring gear R1 to rotate. Similar to the third operating mode, as described above, rotation of first ring gear R1 may affect first carrier C1 and first sun gear S1 to rotate. First clutch 26 may be engaged, mechanically connecting first and second carriers C1, C2 together. As such, first carrier C1 may affect second carrier C2 to rotate. Additionally, first motor/generator 30 may receive mechanical power from first sun gear S1, circuit 40 may transfer electrical power from first motor/generator 30 to second motor/generator 32, and second motor/generator 32 may input mechanical power to second ring gear R2. Second clutch 28 may be engaged, mechanically connecting first and second sun gears S1, S1 together. As such, first sun gear S1 may affect second sun gear S2 to rotate.

Second planetary gear set 14 may be configured to receive rotational inputs via second ring gear R2, second carrier C2, and second sun gear S2. As is known in the art, the rotational inputs of second planetary gear set 14 may be combined and output, via second carrier C2, to final drive 18.

It is contemplated that first and second motor/generators 30, 32 may be operated in either a driving mode, i.e., a mechanical power delivering mode, or a driven mode, i.e., a mechanical power receiving mode. As such, first motor/generator 30 may be configured to transfer electrical power to second motor/generator 32, as described above. Alternatively, second motor/generator 32 may be configured to receive mechanical power from second ring gear R2 and transfer electrical power to first motor/generator 30.

In addition to the four exemplary operating modes described above with reference to FIGS. 2-5, Table 1 shows additional operating modes, in which gear train 10 may be configured to operate. Although not described in detail for clarification purposes, it is contemplated that by selectively engaging various combinations of first, second, and third brakes 20, 22, 24 as well as first and second clutches 26, 28, gear train 10 may be operated in the operational modes provided in Table 1. Specifically, Table 1 indicates which of first, second, and third brakes, 20, 22, 24, if any, and which of first and second clutches 26, 28, if any, are to be engaged. In addition, Table 1 indicates the operational mode of first and second motor/generators 30, 32. The additional operating modes may include, for example, a parking/idling/neutral modes, starting modes, electrical drive modes, and reverse modes.

Figure 6:
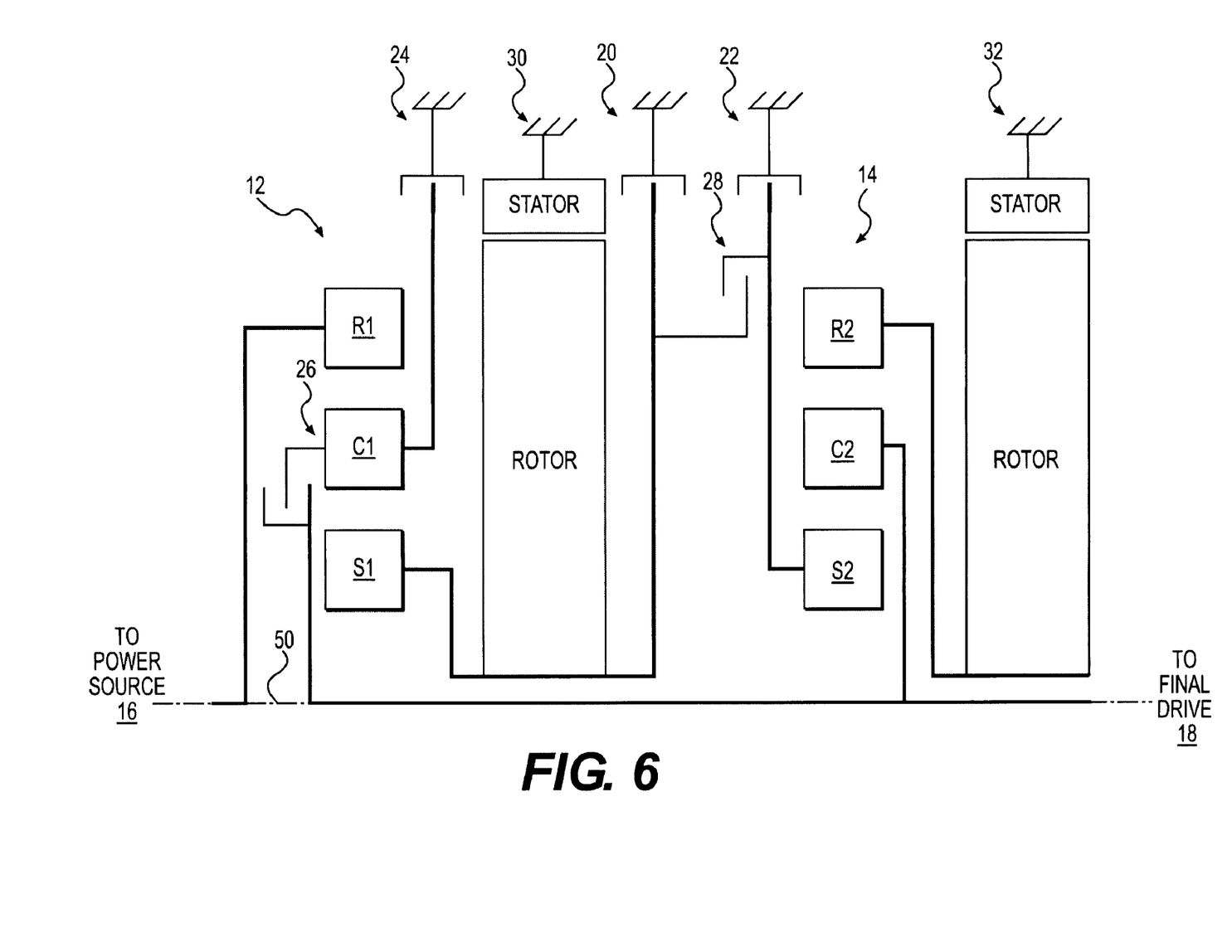
FIG. 6 is a schematic illustration of an exemplary arrangement of the gear train of FIG. 1.

FIG. 6 illustrates an exemplary arrangement of gear train 10. Specifically, gear train 10 may be arranged about a centerline axis 50 with respective shafts of first and second sun gears S1, S2, first and second carriers C1, C2, first and second ring gears R1, R2, and first and second motor/generators 30, 32 (shown with bold lines in FIG. 6) being substantially coaxial with centerline axis 50. Gear train 10 may be arranged within a housing (not shown) such that first and second planetary gear sets 12, 14 and first and second motor/generators 30, 32 are arranged substantially coaxially with centerline axis 50. Additionally, first, second, and third brakes 20, 22, 24 as well as first and second clutches 26, 28 may each be arranged substantially coaxially with centerline axis 50. It is contemplated that the arrangement shown in FIG. 6 may enable gear train 10, and the components thereof, to be compactly arranged within a housing enabling gear train 10 to be interconnected with power source 16 and final drive 18 within a drive train of a vehicle or machine. It is also contemplated that although first and second motor/generators 30, 32 are shown as electrical motor/generators having a rotor and a stator, the arrangement shown in FIG. 6 may be equally suitable for a hydraulic or pneumatic motor/generators.

INDUSTRIAL APPLICABILITY

The disclosed system may be applicable as a universal gear train and may be configured to selectively provide a parallel transmission, a series transmission, and a continuously variable transmission. Gear train 10 may receive input power from power source 16 connected to first ring gear R2 of the first planetary gear set 12. Gear train 10 may output power to final drive 18 connected to second carrier C2 of second planetary gear set 14. The input-output ratio between power source 16 and final drive 18, and thus gear train 10, may be varied or fixed depending upon which of first, second, and third brakes 20, 22, 24, are engaged, which of first and second clutches 26, 28 are engaged, and the operational mode of first and second motor/generators 30, 32.

Depending upon the operational mode of gear train 10, the power input received from power source 16 may or may not be varied. As such, power source 16 may be operated at one or more desired operating points, e.g., maximum power or maximum fuel economy, while additional power is supplied to final drive 18 via one or both of first and second motor/generators 30, 32. Additionally, in some operating modes of gear train 10, e.g., electric drive only and/or starting modes, gear train 10 may not receive any power from power source 16. Furthermore, in some operating modes of gear train 10, the input-output power ratio between power source 16 and final drive 18 may be continuously varied.

It will be apparent to those skilled in the art that various modifications and variations can be made to the disclosed system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A gear train, comprising:
a first planetary gear set including a first sun gear, a first ring gear, and a first carrier;
a second planetary gear set including a second sun gear, a second ring gear, and second carrier;
a first clutch configured to selectively connect the first carrier with the second carrier;
a second clutch configured to selectively connect the first sun gear with the second sun gear;
a first brake configured to selectively fix the first sun gear;
a second brake configured to selectively fix the second sun gear; and
a third brake configured to selectively fix the first carrier a first motor/generator is continuously connected to the first sun gear; and a second motor/generator is continuously connected to the second ring gear; and the first and second motor/generators are connected to one another.

2. The gear train of claim 1, wherein a power source is continuously connected to the first ring gear.

3. The gear train of claim 1, wherein the first and second planetary gear sets are the only planetary gear sets of the gear train.

4. The gear train of claim 1, wherein the first motor/generator is configured to operate as a generator to convert mechanical power received from the first sun gear into electrical power while the second motor/generator is configured to operate as a motor to convert electrical power into mechanical power.

5. A gear train, comprising:
a first planetary gear set including a first sun gear, a first ring gear, and a first carrier;
a second planetary gear set including a second sun gear, a second ring gear, and second carrier;
a first clutch configured to be selectively engaged and disengaged to respectively connect and disconnect the first carrier with the second carrier;
a second clutch configured to be selectively engaged and disengaged to respectively connect and disconnect the first sun gear with the second sun gear;
a first brake configured to be selectively engaged and disengaged to respectively prohibit and allow movement of the first sun gear;
a second brake configured to be selectively engaged and disengaged to respectively prohibit and allow movement of the second sun gear;
a third brake configured to be selectively engaged and disengaged to respectively prohibit and allow movement of the first carrier;
a first motor/generator configured to be selectively operated to deliver mechanical power to the first sun gear and to receive mechanical power from the first sun gear; and
a second motor/generator configured to be selectively operated to deliver mechanical power to the second ring gear and to receive mechanical power from the second ring gear.

6. The gear train of claim 5, wherein during a first operating mode:
the second and third brakes are each selectively engaged;
the first and second clutches and the first brake are each selectively disengaged;
the first motor/generator is configured to convert mechanical power received from the first sun gear into electrical power;
the electrical power is transferred via an electrical circuit to the second motor/generator; and
the second motor/generator is configured to convert the electrical power into mechanical power.

7. The gear train of claim 6, wherein during the first operating mode the first and second planetary gear sets are mechanically disconnected from one another.

8. The gear train of claim 6, wherein during a second operating mode:
the first and second brakes are each selectively engaged;
the first clutch is selectively engaged;
the third brake and second clutch are each selectively disengaged; and
the second motor/generator is configured to convert electrical power received from an electrical storage system into mechanical power.

9. The gear train of claim 8, wherein during a third operating mode:
the second brake and the first clutch are each selectively engaged;
the first and third brakes and the second clutch are each selectively disengaged;
the first motor/generator is configured to convert mechanical power received from the first sun gear into electrical power;
the electrical power is transferred via an electrical circuit to the second motor/generator; and
the second motor/generator is configured to convert the electrical power into mechanical power.

10. The gear train of claim 9, wherein during a fourth operating mode:
the first and second clutches are each selectively engaged;
the first, second, and third brakes are each selectively disengaged;
the first motor/generator is configured to convert mechanical power received from the first sun gear into electrical power;
the electrical power is transferred via an electrical circuit to the second motor/generator; and
the second motor/generator is configured to convert the electrical power into mechanical power.

11. A gear train, comprising:
a plurality of planetary gear sets, each including a sun gear, a carrier, and a ring gear, the plurality of planetary gear sets consisting essentially of a first planetary gear set and a second planetary gear set;

a plurality of clutches, each configured to selectively connect and disconnect a component of the first planetary gear set to a component of the second planetary gear set;

a plurality of brakes, each configured to selectively fix at least one component of one of the first and second planetary gear sets; and a power source continuously directly connected to the ring gear of the first planetary gear set;

wherein by selectively engaging one or more of the plurality of clutches and plurality of brakes, a plurality of operating modes are enabled, including:

a first mode, wherein the first and second planetary gear sets operate in series via an electrical connection and are mechanically disconnected from one another, a second mode, wherein the first and second planetary gear sets operate in parallel via a mechanical connection and are electrically disconnected, a third mode, wherein the first and second planetary gear sets operate in a continuously variable transmission mode and are connected to one another via a mechanical connection therebetween and an electrical connection therebetween.

12. The gear train of claim 11, wherein the first mode is enabled by:

selectively engaging a first brake to fix the carrier of the first planetary gear set;

selectively engaging a second brake to fix the sun gear of the second planetary gear set; and the first and second planetary gear sets are electrically connected via a first motor/generator connected to the sun gear of the first planetary gear set, a second motor/generator connected to the ring gear of the second planetary gear set, and an electrical circuit connected between the first and second motor/generators.

13. The gear train of claim 11, wherein the second mode is enabled by:

selectively engaging a first brake to fix the sun gear of the first planetary gear set;

selectively engaging a second brake to fix the sun gear of the second planetary gear set; and selectively engaging a first clutch to connect the carrier of the first planetary gear set to the carrier of the second planetary gear set.

14. The gear train of claim 13, wherein when in the second mode a motor/generator receives electrical power from an electrical storage system and delivers mechanical power to the ring gear of the second planetary gear set.

15. The gear train of claim 11, wherein the third mode is enabled by:

selectively engaging the first brake to fix a sun gear of the second planetary gear set;

selectively engaging a first clutch to connect the carrier of the first planetary gear set to the carrier of the second planetary gear set; and the first and second planetary gear sets are electrically connected via a first motor/generator connected to the sun gear of the first planetary gear set, a second motor/generator connected to the ring gear of the second planetary gear set, and an electrical circuit connected between the first and second motor/generators.

16. The gear train of claim 11, wherein the third mode is enabled by:

selectively engaging a first clutch to connect the carrier of the first planetary gear set with the carrier of the second planetary gear set;

selectively engaging a second clutch to connect the sun gear of the first planetary gear set with the sun gear of the second planetary gear set; and the first and second planetary gear sets are electrically connected via a first motor/generator connected to the sun gear of the first planetary gear set, a second motor/generator connected to the ring gear of the second planetary gear set, and an electrical circuit connected between the first and second motor/generators.

17. The gear train of claim 11, wherein a final drive is continuously connected to the carrier of the second planetary gear set.

18. The gear train of claim 11, wherein the plurality of clutches includes a first clutch configured to selectively connect the carrier of the first planetary gear set with the carrier of the second planetary gear set.

* * * * *